United States Patent [19]
Wooten et al.

[11] Patent Number: 5,681,376
[45] Date of Patent: Oct. 28, 1997

[54] ROTATING FLOW DISTRIBUTOR ASSEMBLY FOR USE IN CONTINUOUSLY DISTRIBUTING DECONTAMINATION AND REGENERATION FLUID FLOW

[75] Inventors: Russell C. Wooten; Paul E. Vargas, both of Vero Beach, Fla.

[73] Assignee: Calgon Carbon Corporation, Pittsburgh, Pa.

[21] Appl. No.: 554,860

[22] Filed: Nov. 7, 1995

[51] Int. Cl.⁶ .................................................. B01D 53/04
[52] U.S. Cl. .................. 96/124; 96/130; 96/139
[58] Field of Search ................... 96/108, 121, 124, 96/130, 139; 210/269, 275

[56] References Cited

U.S. PATENT DOCUMENTS

| | | |
|---|---|---|
| 1,971,131 | 8/1934 | Cornetto ................................. 96/124 |
| 2,204,431 | 6/1940 | Moore et al. ........................... 96/124 |
| 2,751,032 | 6/1956 | Ringo et al. ............................ 96/124 |
| 2,751,033 | 6/1956 | Miller .................................... 96/124 |
| 3,040,777 | 6/1962 | Carson et al. . |
| 3,422,848 | 1/1969 | Liebman et al. . |
| 4,062,777 | 12/1977 | Tsuruta et al. ....................... 96/130 X |
| 4,209,308 | 6/1980 | Blodgett ................................ 96/124 |
| 4,469,494 | 9/1984 | Van Weenen ......................... 96/124 |
| 4,614,204 | 9/1986 | Dolejs . |
| 4,614,205 | 9/1986 | Oroskar . |
| 4,632,149 | 12/1986 | Oroskar et al. . |
| 4,705,627 | 11/1987 | Miwa et al. . |
| 4,787,417 | 11/1988 | Windsor, Jr. ....................... 96/124 X |
| 4,923,616 | 5/1990 | Hirata et al. . |
| 4,963,168 | 10/1990 | Spencer ............................... 96/130 X |
| 5,112,367 | 5/1992 | Hill . |
| 5,133,784 | 7/1992 | Boudet et al. ...................... 96/130 X |
| 5,248,325 | 9/1993 | Kagimoto et al. . |
| 5,256,174 | 10/1993 | Kai et al. . |
| 5,268,021 | 12/1993 | Hill et al. . |
| 5,366,541 | 11/1994 | Hill et al. . |
| 5,429,663 | 7/1995 | Cassidy et al. . |
| 5,456,825 | 10/1995 | Negawa et al. . |
| 5,457,260 | 10/1995 | Holt . |

FOREIGN PATENT DOCUMENTS

| | | | |
|---|---|---|---|
| 1062676 | 8/1959 | Germany ................................. 96/121 |
| 4315578 | 11/1994 | Germany ................................. 96/130 |
| 51-052370 | 5/1976 | Japan ..................................... 96/130 |
| 60-102917 | 6/1985 | Japan ..................................... 96/130 |
| 60-132622 | 7/1985 | Japan ..................................... 96/124 |
| 1493296 | 7/1989 | U.S.S.R. ................................. 96/121 |
| 0508372 | 6/1939 | United Kingdom ................... 96/124 |
| 0942261 | 11/1963 | United Kingdom ................... 96/124 |
| WO94/15698 | 7/1994 | WIPO ..................................... 96/130 |

*Primary Examiner*—Robert Spitzer
*Attorney, Agent, or Firm*—Titus & McConomy

[57] ABSTRACT

The rotating flow distributor assembly comprises a cylindrical housing, with an inlet port and an outlet port, that receive and discharge the flow of fluid undergoing decontamination. The fluid passes into two flow distribution chambers located at either end of the housing, each of which houses a rotating flow diverter, which direct the fluid through the contaminant removal medium. Each flow distribution chamber is ringed by a set of openings distributed evenly around the circumference of the housing, through which the flow diverters distribute the fluid into the individual segments of the decontamination medium bed. Simultaneous with the distribution of contaminated fluid through the decontamination medium bed, the flow diverters direct regeneration fluid flow through the segments of the decontamination medium bed to remove the impurities from the contaminant removal medium. The rotating flow diverters are stepped through their 360 degree rotation in phase to sequentially regenerate a single decontamination medium bed segment at a time. The regeneration takes place in this single decontamination medium bed segment while the other decontamination medium bed segments are simultaneously accomplishing contaminant removal.

24 Claims, 6 Drawing Sheets

ROTATING FLOW DISTRIBUTOR ASSEMBLY FOR USE IN CONTINUOUSLY DISTRIBUTING DECONTAMINATION AND REGENERATION FLUID FLOW

FIELD OF THE INVENTION

The present invention relates to an apparatus for continuously distributing fluid flow in industrial applications which may require removal of contaminants from a fluid stream. In particular, this invention is intended for use in the continuous removal of volatile organic compounds (VOCs) from a point source thereof, and for simultaneous regeneration of the adsorbent used in their removal. Other applications for use of the invention are also possible, such as in a water backflushing operation for the removal of sludge and other solid pollutants from liquids.

BACKGROUND OF INVENTION

Methods and apparatus for the removal of contaminants, in particular, volatile organic compounds ("VOC") from air streams are very well known. Typical of such systems is the use of activated carbon for the removal of VOCs and the use of a heated regeneration gas for desorbing the adsorbed VOCs from the adsorbent. To provide a substantially continuous removal process, at least two adsorber vessels are used in which one adsorber is adsorbing the VOCs from the gas stream while the other adsorber is being regenerated for use. In some cases more than two vessels are used to enhance the continuity of the system's performance.

The apparatus and methods of the prior art that are used for VOC removal from the commercial gas stream provide satisfactory removal rates. However, these processes require the use of large stationary systems with a complex network of piping systems, a large number of valves to control fluid flow, and high flow rates of hot desorption (regenerative) gases.

Accordingly, it is an object of the present invention to provide a method and apparatus for the efficient removal of contaminants from fluid streams using a single rotating flow distribution assembly, which eliminates the need for a complex valve and piping network to accomplish fluid decontamination.

It is yet a further object of the invention to provide an apparatus which is capable of simultaneous fluid decontamination and contaminant removal medium regeneration using a single rotating flow distribution assembly.

It is a further object of the invention to provide an apparatus for the removal of fluid contaminants which minimizes the number of components necessary to accomplish decontamination, and which can be made portable and capable of being attached to point sources of contaminant generation.

It is another object of this invention to provide a method and apparatus for a water backflush that accomplishes the removal of sludge and other solid pollutants from liquids.

SUMMARY OF THE INVENTION

The rotating flow distributor assembly comprises a cylindrical housing, with an inlet port and an outlet port, that receive and discharge the flow of fluid undergoing decontamination. The fluid passes into two flow distribution chambers located at either end of the housing, each of which houses a rotating flow diverter, which direct the fluid through the contaminant removal medium. The contaminant removal medium is preferably divided into a plurality of individual segments. Each flow distribution chamber is ringed by a set of openings which are preferably distributed evenly around the circumference of the housing and through which the flow diverters distribute the fluid into the individual segments of the decontamination medium bed. Simultaneous with the distribution of contaminated fluid through the decontamination medium bed, the flow diverters direct regeneration fluid flow through the segments of the decontamination medium bed to remove the impurities from the contaminant removal medium. The rotating flow diverters are sequentially stepped in phase through 360 degrees of rotation to regenerate a single decontamination medium bed segment at a time. The regeneration takes place in this single decontamination medium bed segment while the other decontamination medium bed segments are simultaneously accomplishing contaminant removal. Other details, objects, and advantages of the present invention will become apparent in the following description of the presently preferred embodiments.

BRIEF DESCRIPTION OF THE DRAWINGS

FIG. (1) is a side view of the flow distributor assembly housing mounted in a fluid decontamination medium bed.

FIG. (2) is an overhead view of the decontamination medium bed.

Figure 1:
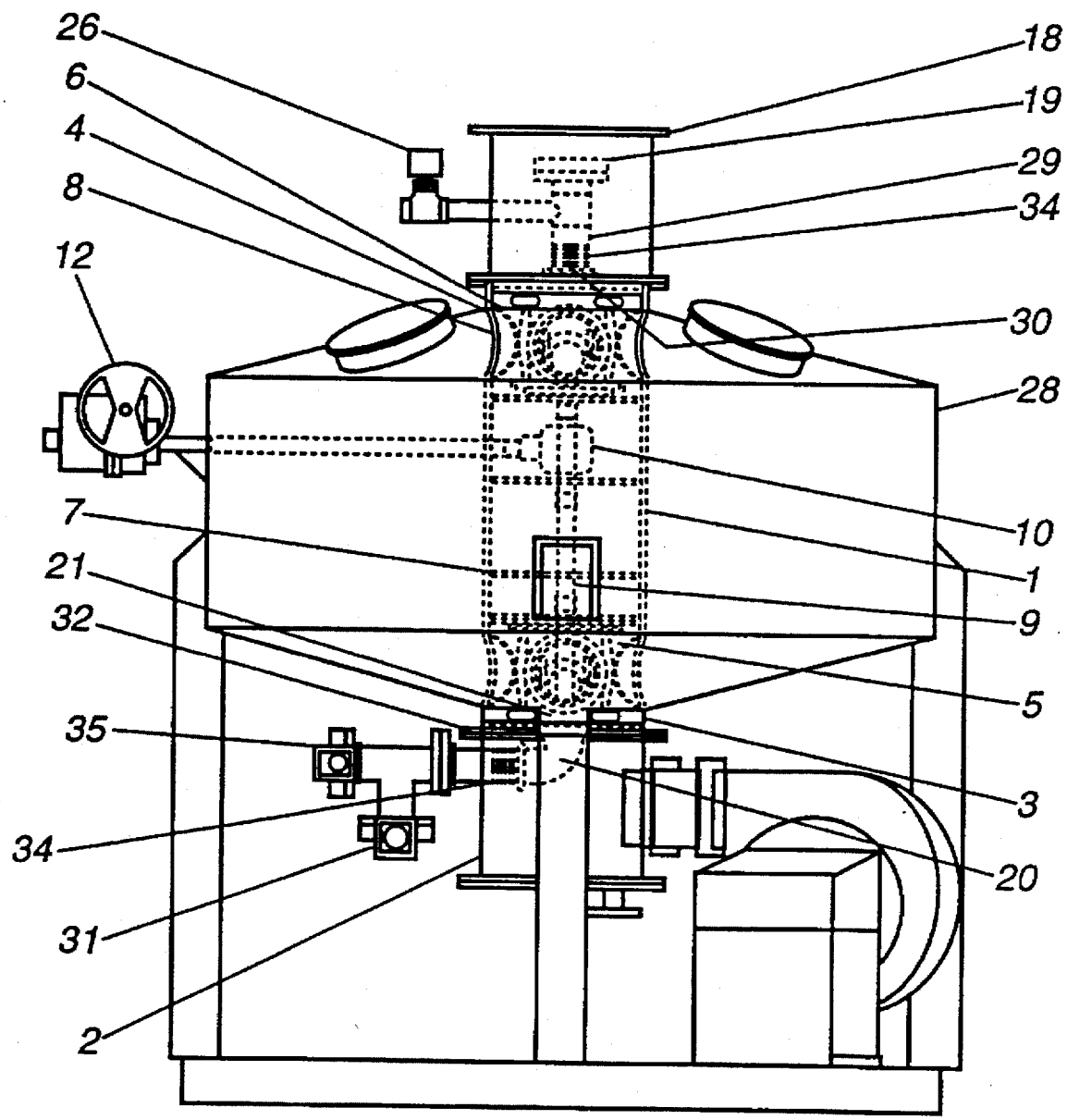
Figure 2:
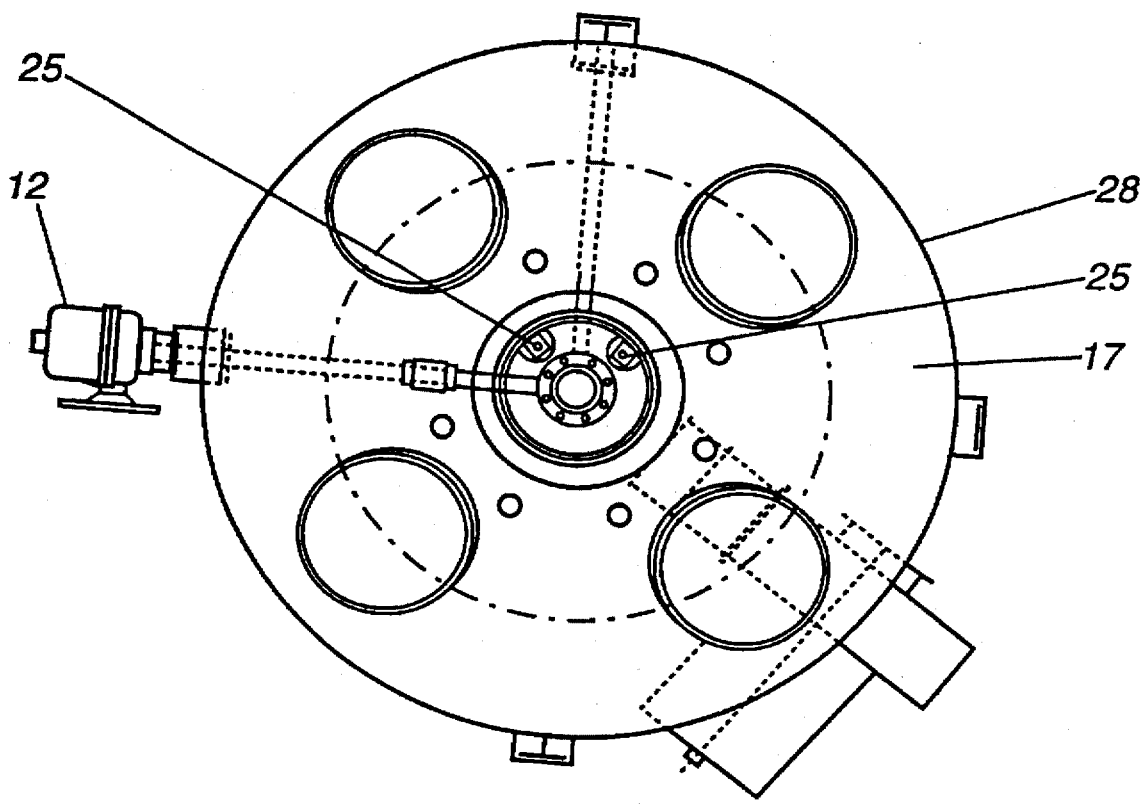
Figure 3:
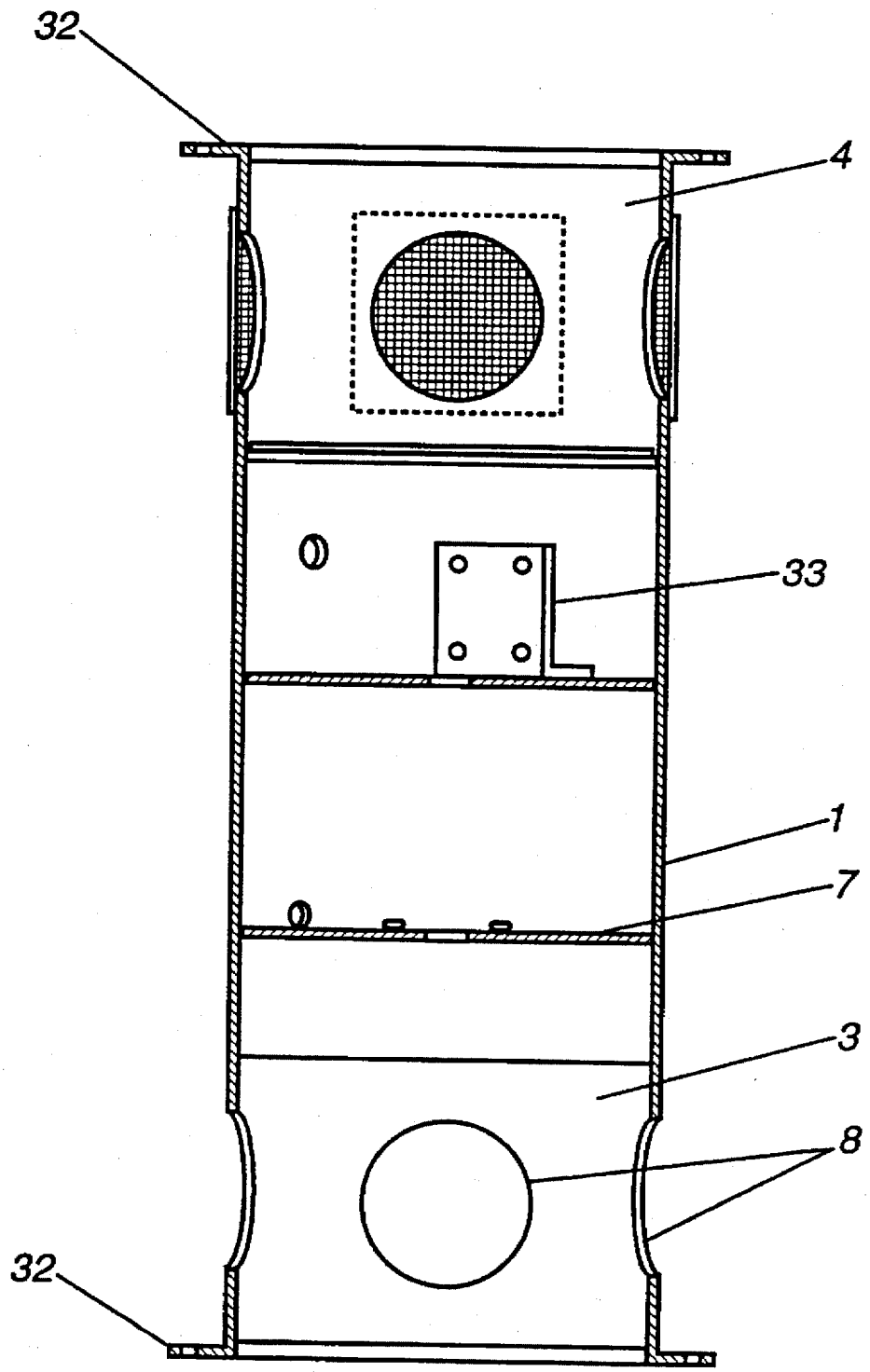
Figure 4:
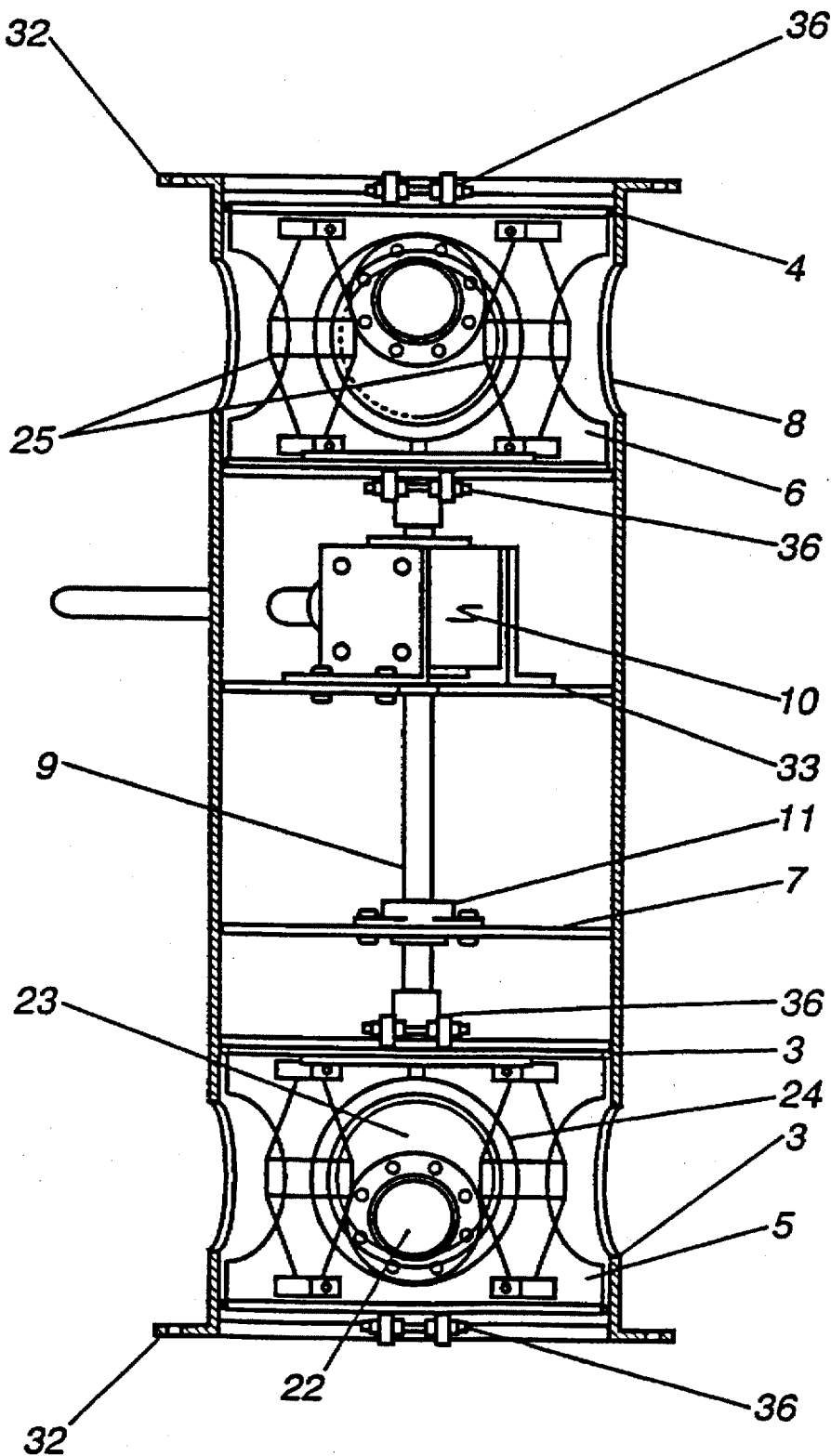
Figure 5:
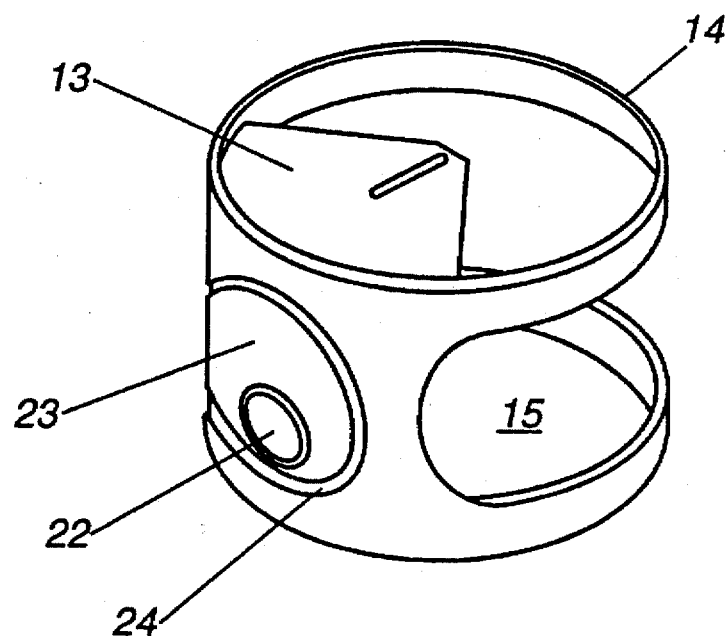
Figure 6:
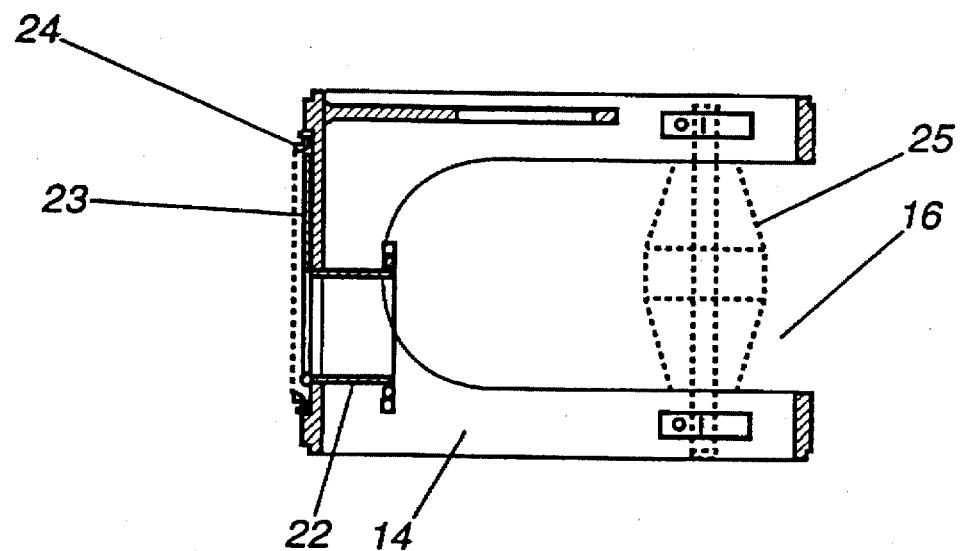
Figure 7:
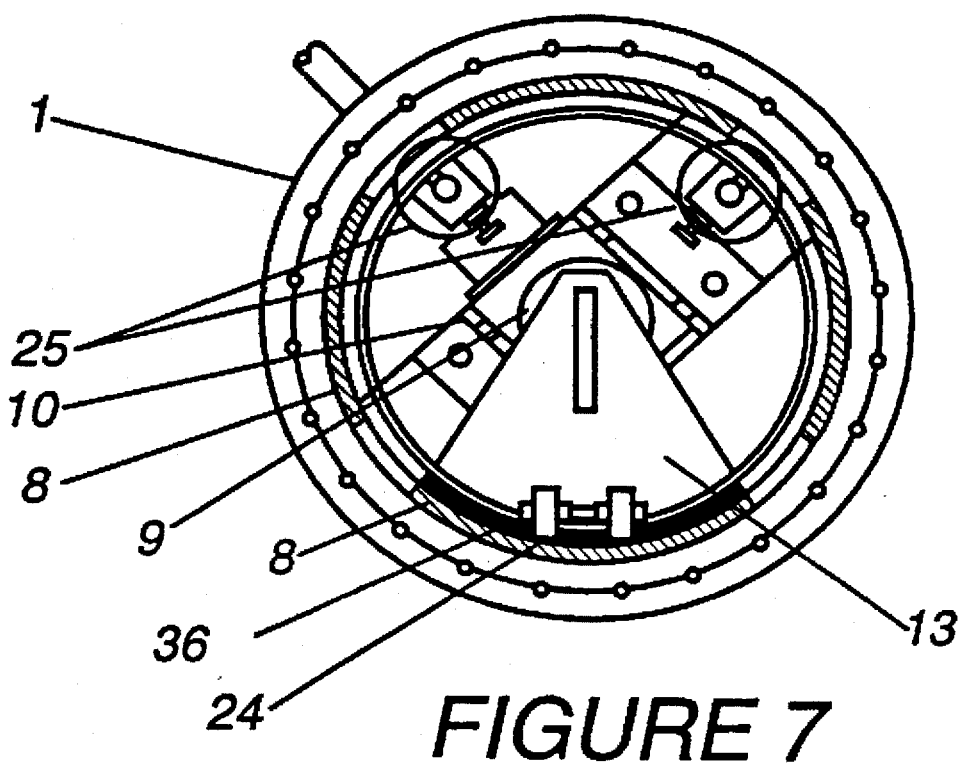

FIG. (3) is a side view of the exterior of the flow distributor assembly housing.

FIG. (4) is a side view of the interior of the flow distributor assembly housing.

FIG. (5) is a three dimensional isometric view of a flow diverter.

FIG. (6) is a side view of the interior of a flow diverter.

FIG. (7) is an overhead view of a flow diverter as it is assembled into a flow distribution chamber.

DETAILED DESCRIPTION OF THE PREFERRED EMBODIMENT

Referring to FIG. (1), the preferred embodiment of the rotating flow distributor assembly comprises a cylindrical housing 1, with an inlet port 2 and an outlet port 18, that receive and discharge the flow of fluid undergoing decontamination. The fluid passes through two flow distribution chambers 3 and 4 located at either end of the housing 1, each of which houses a rotating flow diverter 5 and 6, which direct the fluid through the contaminant removal medium. Referring to FIGS. (3) and (4), each flow distribution chamber 3 or 4 is ringed by a set of openings 8 distributed evenly around the circumference of the housing 1, through which the flow diverters 5 and 6 distribute the fluid into the individual segments 17 of the decontamination medium bed 28, shown in FIG. (2). Simultaneous with the distribution of contaminated fluid through the decontamination medium bed 28, the flow diverter 5 and 6 direct regeneration fluid flow through the segments 17 of the decontamination medium bed 28 to remove the impurities from the contaminant removal medium. The rotating flow diverters 5 and 6 are stepped through their 360 degree rotation in phase to sequentially regenerate a single decontamination medium bed segment 17 at a time. The regeneration takes place in this single decontamination medium bed segment while the other decontamination medium bed segments are simultaneously accomplishing contaminant removal.

Referring to FIGS. (1) and (3), the rotating flow distributor assembly housing 1 is preferably welded inside the center of a structure 28 containing the contaminant removal medium. Flanged disconnects 32, facilitate removal of the interior components of the flow distributor assembly, resulting in portability and maintainability. Referring to FIGS. (3) and (4), the flow distribution chambers 3 and 4 are sealed from the interior of the housing 1 by a metal disc 7, which is welded to the housing. The interior of the housing 1 contains a drive shaft 9 25 and a rotation means 10, which are mounted on an L-shaped bracket 33 that is bolted to a plate welded to the housing 1. The drive shaft 9 is connected to the two flow diverters 5 and 6, which each rotate 360 degrees about the center axis of the housing 1. The drive shaft is mounted to a bearing 11 that forms a seal at the opening in the center of the metal disc 7 to prevent incoming fluid from escaping the flow distribution chambers 3 and 4 into the interior of the housing 1. In the preferred embodiment, the rotation means 10 is a geared transmission assembly which is mechanically linked to an actuator 12 located outside the housing 1, as shown in FIGS. (1) and (2). Other configurations are possible, such as locating the actuator 12 inside the housing 1. The actuator 12 in the preferred embodiment is electrical, using limit switches to control the movement of the rotation means 10. However, a hand crank is also provided as a backup means of actuator 12 operation. Finally, the cylindrical shape of the housing 1 is not critical, as it could take any symmetrical form which would allow for rotation of the flow diverters 5 and 6, such as a hexagon or an octagon.

Referring to FIGS. (5) and (6), each flow diverter 5 or 6 has a casing which is constructed of two metal hoops 14 joined by an integral closed face 23. The two cylindrical hoops 14 form a hollow cylindrical slot 16 which borders the hollow interior 15 of each flow diverter 5 or 6. This cylindrical slot 16 is in communication with the openings 8 in the flow distribution chambers 3 and 4. This communication creates the path through which flow takes place from the flow distributor assembly housing 1 into the decontamination medium bed 28. Referring to FIGS. (4) and (7),each flow diverter 5 or 6 is kept in place inside its respective flow distribution chamber 3 or 4 by a pair of metal keeper rings 36, which have bolted projections that expand the keeper ring 36 into the housing 1, and which provide surfaces on which each flow diverter 5 or 6 rotates. Referring to FIGS. (5) and (7), each flow diverter 5 or 6 is connected to the drive shaft 9 by means of a triangular plate 13, which is welded to the top of the closed face 23.

Referring to FIGS. (1) and (6), decontamination flow enters the flow distributor assembly through the inlet port 2, where it passes into the inlet flow distribution chamber 3. Once the decontamination flow has entered the inlet flow distribution chamber 3, it enters in and around the hollow opening 15 of inlet flow diverter 5. It is then directed out of the inlet flow diverter 5 through and around cylindrical slot 16, and into a segment 17 of the decontamination medium bed 28 through an opening 8 of the inlet flow distribution chamber 3. Decontaminants are removed as the decontamination flow passes through a segment 17 of the decontamination medium bed 28. The decontaminated flow is then directed back through an opening 8 in the outlet flow distribution chamber 4, into and around the cylindrical slot 16 of the outlet flow diverter 6. The decontaminated flow is then directed out through and around the hollow opening 15 of the outlet flow diverter 6, and exhausted out of an exhaust port 18 at the top of the flow distributor assembly housing.

Referring to FIG. (1), the hollow opening 15 of each flow diverter 5 or 6 contains a pipe 20 or 29 through which regeneration flow takes place to remove the impurities from the decontamination medium bed 28. One end of this regeneration pipe 20 or 29 passes through the flow diverter hollow opening 15, where it is connected to a rotatable swivel joint 21 or 30 that is attached to either the inlet port 2 or the exhaust port 18 of the flow distributor assembly. The swivel joint 21 or 30 is attached to the inlet port 2 or exhaust port 18 by means of a flexible connection 34 which reduces the stress on the regeneration pipe 20 or 29 as the flow diverter 5 or 6 rotates. The end 22 of the regeneration pipe 20 or 29 opposite the swivel joint 21 penetrates through the flow diverter closed face 23, as shown in FIGS. (5) and (6). This penetration end 22 of the regeneration pipe 20 or 29 directs the regeneration flow through the segment 17 of the decontamination medium bed 28 undergoing regeneration.

Referring to FIGS. (5) and (6), a flexible face seal 24, surrounds the penetration end 22 of the regeneration pipe 20 or 29. This face seal 24 is forced against the flow distribution chamber opening 8 in contact with the flow diverter closed face 23, sealing the penetration end 22 of the regeneration pipe 20 or 29 to the segment 17 of the decontamination medium bed 28 undergoing regeneration. This forcing action is provided by a pair of cam rollers 25, mounted to each flow diverter 5 or 6. The cam rollers 25, shown in FIGS. (6) and (7), are positioned such that the smallest force will be provided as the face seal 24 is passing the edge of the next flow distribution chamber opening 8 in the rotation sequence, while providing the greatest force when the face seal 24 is fully aligned with the flow distribution chamber opening 8. The seal formed by this camming action isolates the segment 17 of the decontamination medium bed 28 undergoing regeneration from the other segments which are simultaneously accomplishing decontamination. The face seal 24 is made of Teflon in the preferred embodiment, but can be made of any material suitable to form a seal between the flow distribution chamber opening 8 and the penetration end 22 of the regeneration pipe 20 or 29.

Referring again to FIG. (1), the regeneration flow enters the flow distributor assembly housing 1 through the regeneration supply valve 26, while the conditioning flow exhaust valve 19 is closed to prevent regeneration flow from escaping through the exhaust 18. Regeneration flow enters the outlet regeneration pipe 29 through the swivel joint 30 connected to the outlet flow distribution chamber 4, where it is directed through the penetration end 22 into the segment 17 of the decontamination medium bed 28 undergoing regeneration. Regeneration flow then removes the contaminants from the segment 17 of the decontamination medium bed 28 undergoing regeneration, after which the regeneration flow passes through the inlet flow distribution chamber 3 into the penetration end 22 of the inlet regeneration pipe 20 located in the inlet flow diverter 5. The contaminants contained in the regeneration flow are then removed by passing the regeneration flow through the swivel joint 21 connected to the inlet port 2, where it exits through a pipe 27 leading out of the flow distributor assembly housing 1.

Referring finally to FIG. (1), the conditioning flow inlet valve 31 and conditioning flow exhaust valve 19 are used to direct conditioning flow through the decontamination medium bed 28. Conditioning flow inlet valve 31 and conditioning flow exhaust valve 19 are open when regeneration supply valve 26 and regeneration exhaust valve 35 are closed. Conditioning flow is periodically necessary to assist in contamination removal efficiency. While presently preferred embodiments of practicing the invention has been shown and described with particularity in connection with accompanying drawings, the invention may otherwise be embodied within the scope of the following claims.

What is claimed is:

1. In combination, a fluid-containing medium having multiple segments and a rotating flow distributor assembly for use in continuously distributing a first and a second fluid flow to said medium, said flow distributor assembly comprising:
   A. a housing, with a first end and a second end opposite said first end having:
      (i) an inlet port,
      (ii) an exhaust port spaced apart from said inlet port,
      (iii) a first flow distribution chamber located at said first end of said housing and a second flow distribution chamber located at said second end of said housing, each of said flow distribution chambers having a hollow interior, and
      (iv) a plurality of openings within each of said flow distribution chambers distributed circumferentially around said housing;
   B. a first flow diverter located within said interior of said first flow distribution chamber, and a second flow diverter located inside said interior of said second flow distribution chamber, each said flow diverter rotating about said housing center axis;
   C. a rotatable drive shaft, extending through said housing, connecting said flow diverters; and
   D. a means for rotating said drive shaft;
wherein said flow diverters deliver said first fluid flow to substantially more than half of said segments while delivering said second fluid flow to the remainder of said segments.

2. The rotating flow distributor assembly of claim 1, further comprising:
   A. flanged disconnects at either end of said housing; and
   B. a means for rotating said drive shaft which comprises a geared transmission assembly.

3. The rotating flow distributor assembly of claim 2, in which the means for rotating said drive shaft is mechanically controlled.

4. The rotating flow distributor assembly of claim 2, in which the means for rotating said drive shaft is electrically controlled.

5. The rotating flow distributor assembly of claim 1, wherein each said flow diverter comprises:
   A. a casing having a hollow interior and a single closed end that sequentially abuts each opening of said flow distribution chamber as said flow diverter rotates;
   B. a pipe located inside said interior having:
      (i) a rotatable first end which connects said pipe to either said inlet port or said exhaust port of said housing,
      (ii) a second end which penetrates said closed end of said casing; and
   C. a seal covering said pipe second end which forms a seal against the opening of said flow distribution chamber in contact with said closed end of said casing.

6. The rotating flow distributor assembly of claim 5, further comprising:
   A. a pair of flexible connections, one of which is connected to each said pipe, which relax the stress on said pipe as said flow diverter rotates;
   B. two pair of rollers, one pair being mounted on each said flow diverter, which forces said seal against the opening of said flow distribution chamber in contact with said closed end of said casing.

7. The rotating flow distributor assembly of claim 6, in which the means for rotating said drive shaft is mechanically controlled.

8. The rotating flow distributor assembly of claim 6, in which the means for rotating said drive shaft is electrically controlled.

9. The rotating flow distributor assembly of claim 5, in which the means for rotating said drive shaft is mechanically controlled.

10. The rotating flow distributor assembly of claim 5, in which the means for rotating said drive shaft is electrically controlled.

11. The rotating flow distributor assembly of claim 1, in which the means for rotating said drive shaft is mechanically controlled.

12. The rotating flow distributor assembly of claim 1, in which the means for rotating said drive shaft is electrically controlled.

13. In combination, a contaminant-containing medium having multiple segments and a rotating flow distributor assembly for use in distributing decontamination and regeneration flow to said medium in a fluid contaminant continuous decontamination and regeneration process, said flow distributor assembly comprising:
   A. a housing, with an inlet end and an outlet end opposite said inlet end, having:
      (i) an inlet port, located at said inlet end of said housing,
      (ii) an exhaust port, located at said outlet end of said housing,
      (iii) an inlet flow distribution chamber forming said inlet end of said housing, and an outlet flow distribution chamber forming said outlet end of said housing, each said flow distribution chamber having a hollow interior, and
      (iv) a plurality of openings within each said flow distribution chamber, distributed circumferentially around said housing;
   B. an inlet flow diverter located inside said interior of said inlet flow distribution chamber, and an outlet flow diverter located inside said interior of said outlet flow distribution chamber, each said flow diverter rotating 360 degrees about said housing center axis;
   C. a rotatable drive shaft, extending through said housing, connecting said flow diverters through said housing center axis; and
   D. a means for rotating said drive shaft;
wherein said flow diverters deliver said regeneration fluid flow to one said segment while delivering said decontamination fluid flow to the remainder of said segments.

14. The rotating flow distributor assembly of claim 13, further comprising:
   A. flanged disconnects at either end of said housing; and
   B. a means for rotating said drive shaft which comprises a geared transmission assembly.

15. The rotating flow distributor assembly of claim 14, in which the means for rotating said drive shaft is mechanically controlled.

16. The rotating flow distributor assembly of claim 14, in which the means for rotating said drive shaft is electrically controlled.

17. The rotating flow distributor assembly of claim 13, wherein each said flow diverter comprises:
   A. a circular casing, having a hollow interior bordered by a cylindrical slot, and a single closed face that sequentially abuts each opening of said flow distribution chamber as said flow diverter rotates;
   B. a regeneration pipe, located inside said casing cavity, having:

(i) a swivel end, which connects said pipe to either said inlet port or said exhaust port of said housing, (ii) a penetration end, which penetrates said closed face of said casing; and C. a face seal covering said regeneration pipe penetration end, which forms a seal against the opening of said flow distribution chamber in contact with said closed face of said casing.

18. The rotating flow distributor assembly of claim 17, further comprising:

A. ranged disconnects at either end of said housing;

B. a pair of flexible joints, one of which is connected to said swivel end of each said regeneration pipe, which relax the stress on said regeneration pipe as said flow diverter rotates;

C. two pair of cam rollers, one pair being mounted on each said flow diverter, which force said face seal against the openings of said flow distribution chamber in contact with said closed face of said casing; and D. a means for rotating said drive shaft which comprises a geared transmission assembly.

19. The rotating flow distributor assembly of claim 18, in which the means for rotating said drive shaft is mechanically controlled.

20. The rotating flow distributor assembly of claim 18, in which the means for rotating said drive shaft is electrically controlled.

21. The rotating flow distributor assembly of claim 17, in which the means for rotating said drive shaft is mechanically controlled.

22. The rotating flow distributor assembly of claim 17, in which the means for rotating said drive shaft is electrically controlled.

23. The rotating flow distributor assembly of claim 13, in which the means for rotating said drive shaft is mechanically controlled.

24. The rotating flow distributor assembly of claim 13, in which the means for rotating said drive shaft is electrically controlled.

\* \* \* \* \*